United States Patent
Ohtsubo et al.

(10) Patent No.: US 11,731,266 B2
(45) Date of Patent: Aug. 22, 2023

(54) ROBOT SYSTEM, CONVEYING DEVICE, AND WIRING METHOD

(71) Applicant: KABUSHIKI KAISHA YASKAWA DENKI, Kitakyushu (JP)

(72) Inventors: Naoyuki Ohtsubo, Kitakyushu (JP); Kazuyoshi Matsukane, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 218 days.

(21) Appl. No.: 17/105,512

(22) Filed: Nov. 26, 2020

(65) Prior Publication Data
US 2021/0157296 A1    May 27, 2021

(30) Foreign Application Priority Data
Nov. 27, 2019    (JP) .................. 2019-214651

(51) Int. Cl.
*B25J 9/00*    (2006.01)
*B25J 19/00*    (2006.01)
(Continued)

(52) U.S. Cl.
CPC .......... *B25J 9/0096* (2013.01); *B25J 9/0009* (2013.01); *B25J 19/0029* (2013.01);
(Continued)

(58) Field of Classification Search
CPC .... B25J 9/0084; B25J 12/0029; B25J 9/0009; B25J 9/0093; B25J 19/0025;
(Continued)

(56) References Cited

U.S. PATENT DOCUMENTS 4,764,077 A * 8/1988 Susnjara ............. B05B 13/0431
                                                        414/222.03
9,604,358 B1 * 3/2017 Brazeau ................. B25J 9/0084
(Continued)

FOREIGN PATENT DOCUMENTS

BE    1027534 A1 *  3/2021
DE    3338771 A1 *  5/1985
(Continued)

OTHER PUBLICATIONS

FR 2847505 A1 (Richard Guillou) May 28, 2004 (full text). [online] [retrieved on Nov. 2, 2022], Retrieved from: ProQuest Dialog. (Year: 2004).*
(Continued)

*Primary Examiner* — Joseph Brown
(74) *Attorney, Agent, or Firm* — Mori & Ward, LLP

(57) ABSTRACT

A robot system includes a robot configured to perform work on a workpiece positioned in a working region and a conveying device configured to convey the workpiece to the working region. The conveying device includes a turning part configured to rotate about a center axis, a guide supporting the turning part rotatably about the center axis and having a hollow in the guide extending along the center axis, a workpiece holder configured to hold the workpiece and provided at the turning part to move together with the turning part along a circular orbit around the center axis passing the working region, a first device provided at the turning part, and a linear object passing through the hollow in the guide and connecting the first device and a second device provided around the guide.

19 Claims, 8 Drawing Sheets

(51) Int. Cl.
   *G05B 19/401* (2006.01)
   *B25J 9/04* (2006.01)
(52) U.S. Cl.
   CPC ........... *B25J 9/0093* (2013.01); *B25J 9/04* (2013.01); *G05B 19/401* (2013.01); *G05B 2219/35191* (2013.01)
(58) Field of Classification Search
   CPC ....... B25J 19/0041; B25J 9/04; G05B 19/041; G05B 2219/35191
   See application file for complete search history.

(56) References Cited

U.S. PATENT DOCUMENTS

| | | | | |
|---|---|---|---|---|
| 2007/0243075 | A1* | 10/2007 | Hirose | B05B 13/0221 417/217 |
| 2013/0177370 | A1* | 7/2013 | Yoshino | B25J 9/0096 414/223.01 |
| 2013/0259611 | A1* | 10/2013 | Yoshino | B05B 13/0431 414/223.01 |
| 2014/0137685 | A1* | 5/2014 | Iwayama | B25J 19/0025 901/27 |
| 2014/0165907 | A1* | 6/2014 | Furuya | B65G 47/80 118/500 |
| 2019/0022851 | A1* | 1/2019 | Konno | B25J 19/0025 |
| 2019/0152073 | A1* | 5/2019 | Yamazaki | B25J 9/042 |

FOREIGN PATENT DOCUMENTS

| | | | | |
|---|---|---|---|---|
| DE | 19904422 B4 | * | 7/2009 | ........... B23K 37/047 |
| FR | 2847505 A1 | * | 5/2004 | ........... B23K 37/047 |
| JP | 62-277285 | | 12/1987 | |
| JP | 10-249784 | | 9/1998 | |
| JP | 2001-105380 | | 4/2001 | |
| JP | 2003-124289 | | 4/2003 | |
| JP | 2013-141732 | | 7/2013 | |
| JP | 6798591 B2 | * | 12/2020 | |

OTHER PUBLICATIONS

Chinese Office Action for corresponding CN Application No. 202011335906.0, dated Apr. 2, 2022 (w/ English machine translation).

Japanese Office Action for corresponding JP Application No. 2019-214651, dated Jun. 15, 2021 (w/ English machine translation).

\* cited by examiner

ROBOT SYSTEM, CONVEYING DEVICE, AND WIRING METHOD

CROSS-REFERENCE TO RELATED APPLICATIONS

The present application claims priority under 35 U.S.C. § 119 to Japanese Patent Application No. 2019-214651, filed Nov. 27, 2019. The contents of this application are incorporated herein by reference in their entirety.

BACKGROUND

Technical Field

The disclosure includes an embodiment relating to a robot system, a conveying device, and a wiring method.

Discussion of the Background

Japanese Patent Application Laid-Open No. 2013-141732 describes a robot system including a conveying device and a robot. The conveying device includes a base placed on a ground plane, a turning arm turnably provided on the base and having respective ends provided with turntables that pass an exporting-importing position and a working position preliminarily provided on a circular orbit, and a turn mechanism configured to turn the turning arm such that the turntables revolve about the base. The robot is configured to process a workpiece mounted on a corresponding one of the turntables positioned at the working position.

SUMMARY

According to one aspect of the present invention, a robot system includes a robot configured to perform work on a workpiece positioned in a working region and a conveying device configured to convey the workpiece to the working region. The conveying device includes a turning part configured to rotate about a center axis, a guide supporting the turning part rotatably about the center axis and having a hollow in the guide extending along the center axis, a workpiece holder configured to hold the workpiece and provided at the turning part to move together with the turning part along a circular orbit around the center axis passing the working region, a first device provided at the turning part, and a linear object passing through the hollow in the guide and connecting the first device and a second device provided around the guide.

According to another aspect of the present invention, a conveying device includes a turning part configured to rotate about a center axis, a guide supporting the turning part rotatably about the center axis and having a hollow in the guide extending along the center axis, a workpiece holder configured to hold the workpiece and provided at the turning part to move together with the turning part along a circular orbit around the center axis passing through the working region, a first device provided at the turning part, and a linear object passing through the hollow in the guide and connecting the first device and a second device provided around the guide.

According to further aspect of the present invention, a wiring method includes providing a conveying device which includes a turning part configured to rotate about a center axis; a guide supporting the turning part rotatably about the center axis and having a hollow in the guide extending along the center axis; a workpiece holder configured to hold the workpiece and provided at the turning part to move together with the turning part along a circular orbit around the center axis passing through the working region; and a first device provided at the turning part. The wiring method further includes passing a linear object through the hollow in the guide, connecting a first end of the linear object wired above the turning part to the first device, and connecting a second end of the linear object wired below the turning part to a second device provided around the guide.

DESCRIPTION OF EMBODIMENTS

An embodiment will be described in detail hereinafter with reference to the drawings. The description will refer to identical elements or elements having identical functions to be denoted by identical reference signs, and will not mention repeatedly.

Robot System

Figure 1:
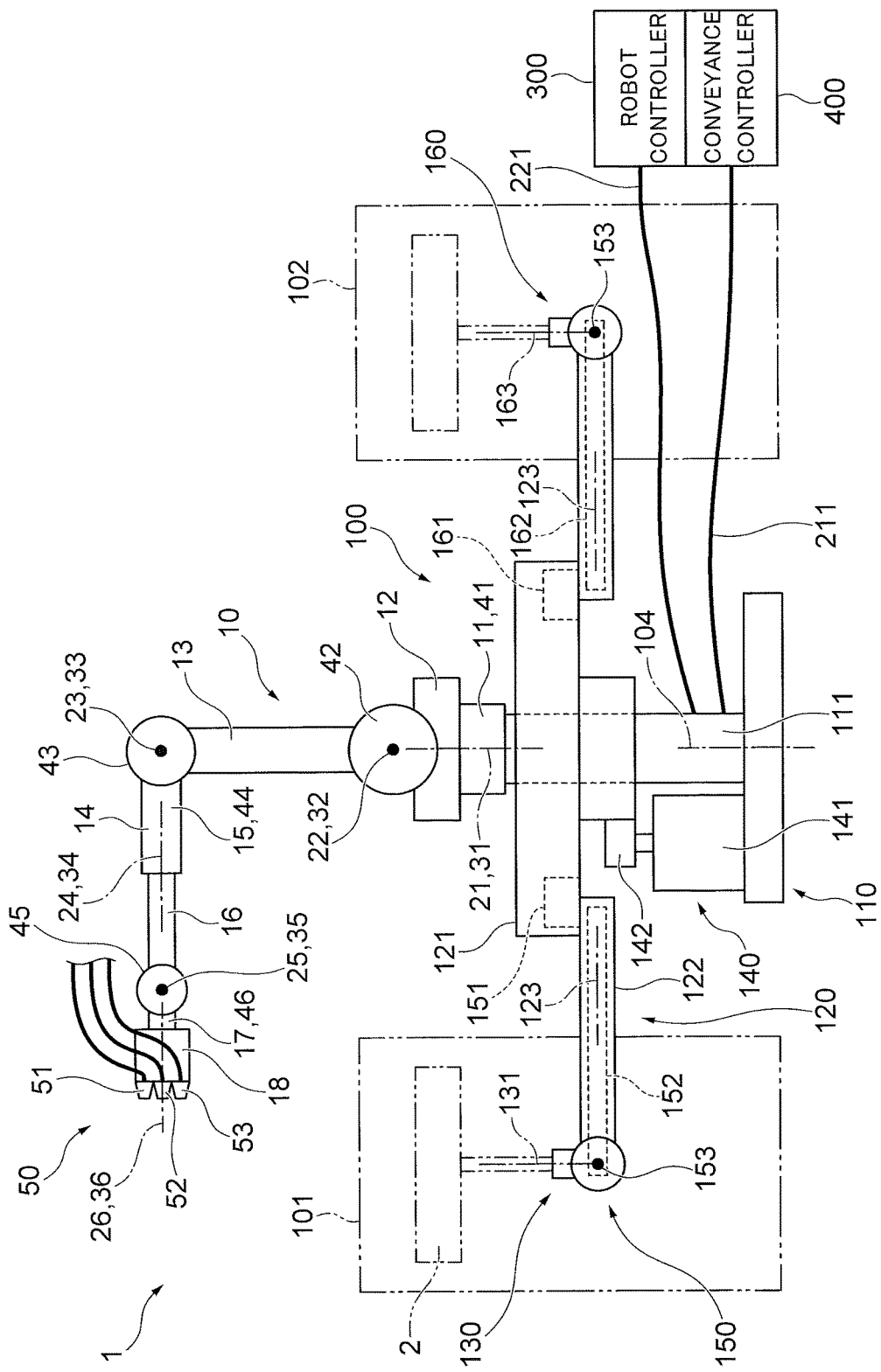
FIG. 1 is a pattern view depicting a schematic configuration of a robot system.
Figure 2:
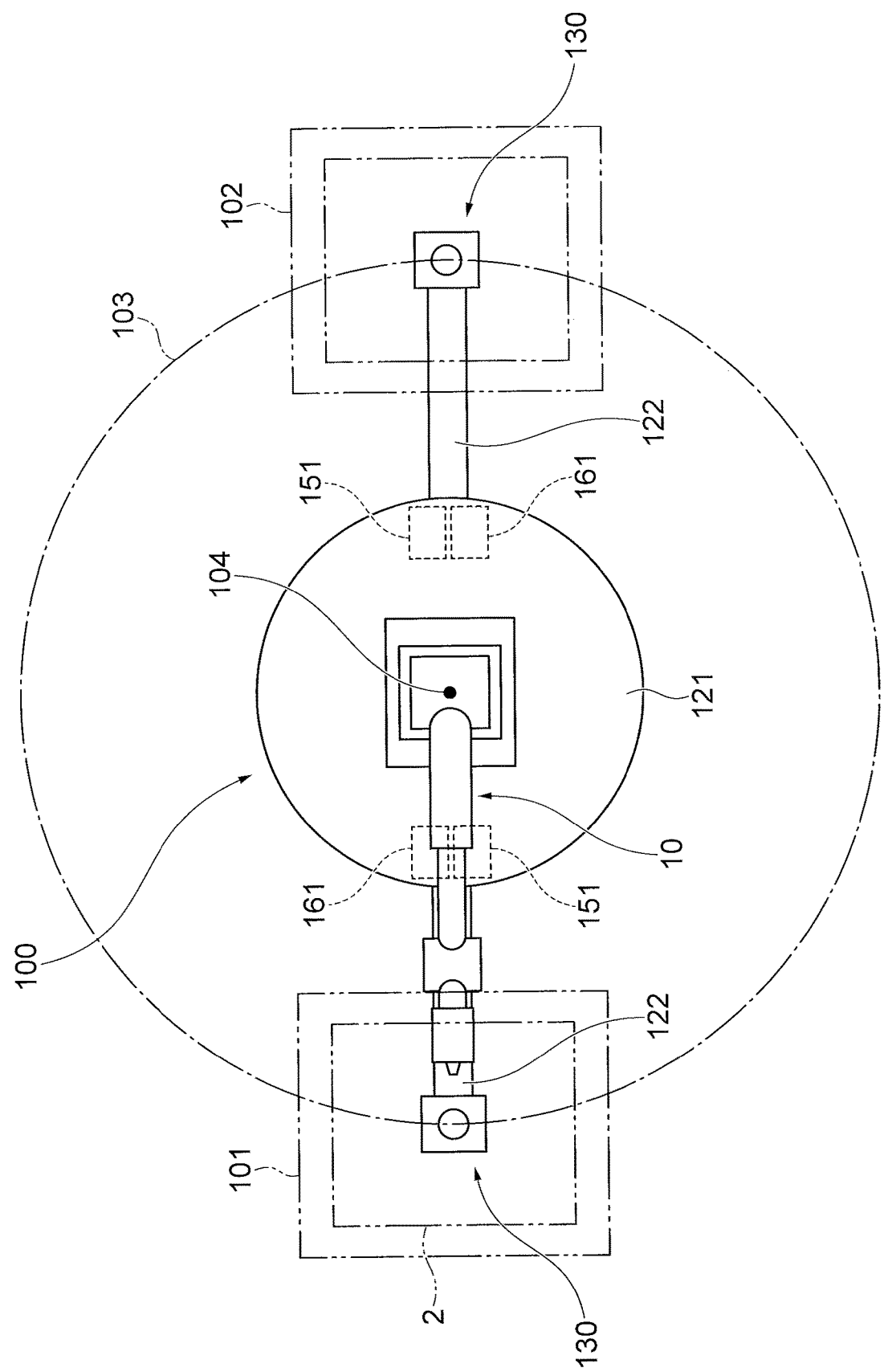
FIG. 2 is a plan view of the robot system depicted in FIG. 1.

FIG. 1 and FIG. 2 depict a robot system 1 configured to apply predetermined work to a workpiece on a production line for manufactured goods. There is no particular limitation on the workpiece or the work. Specifically exemplified hereinafter is a system configured to paint an automobile body part on an automobile production line. The robot system 1 includes a conveying device 100, a robot 10, a robot controller 300, and a conveyance controller 400.

The conveying device 100 is configured to convey the workpiece to a working region 101. The conveying device 100 exemplarily conveys a workpiece 2 along a revolution orbit 103 having a circular shape and passing the working region 101 and a delivery region 102. The working region 101 and the delivery region 102 are exemplarily positioned around a center axis 104 of the revolution orbit 103 to oppose each other. The center axis 104 crosses a horizontal plane. The center axis 104 may be provided vertically or may slant from a vertical line.

The conveying device 100 includes a basal part 110, a turning part 120, a plurality of workpiece holders 130, a revolution drive unit 140, a tilting drive unit 150, and a spin drive unit 160. The basal part 110 is fixed onto a floor surface at a position where the center axis 104 and the floor surface cross each other. The basal part 110 includes a guide 111 projecting upward (e.g. vertically upward) along the center axis 104.

The turning part 120 turns about the center axis 104 of the revolution orbit 103. The turning part 120 exemplarily includes a body 121 and two turning arms 122. The body 121 is fitted to the basal part 110 so as to be turnable about the center axis 104. For example, the guide 111 of the basal part 110 extends along the center axis 104 and penetrates the body 121, and the body 121 is fitted to an outer periphery of the guide 111 with a bearing 129 (see FIG. 3) being interposed therebetween. The two turning arms 122 project in opposite directions from an outer periphery of the body 121, and each have an end reaching the revolution orbit 103.

Each of the workpiece holders 130 is provided at the turning part 120 so as to shift along the revolution orbit 103 when the turning part 120 turns, and holds the workpiece. The conveying device 100 optionally includes the plurality of workpiece holders 130, The plurality of workpiece holders 130 may be provided at the turning part 120 such that one is positioned in the delivery region 102 while another is positioned in the working region 101. The conveying device 100 exemplarily includes two workpiece holders 130. The two workpiece holders 130 are provided at the turning part 120 such that one is positioned in the delivery region 102 while another is positioned in the working region 101. The two workpiece holders 130 are provided respectively at the ends of the two turning arms 122.

The two workpiece holders 130 project upward respectively from the ends of the turning arms 122. Each of the workpiece holders 130 supports the workpiece 2 from below and holds the workpiece 2 by vacuum suction or gripping with a mechanical hand. The conveying device 100 may alternatively include three or more workpiece holders 130.

The revolution drive unit 140 turns the turning part 120 about the center axis 104 of the revolution orbit 103. The revolution drive unit 140 exemplarily includes an electric motor 141, and a transmitter 142 configured to transmit motive power of the motor 141 to the body 121.

The tilting drive unit 150 tilts each of the workpiece holders 130 from the center axis 104 of the revolution orbit 103. Tilting the workpiece holder 130 from the center axis 104 indicates changing an angle formed between a predetermined axis fixed to the workpiece holder 130 and the center axis 104. The tilting drive unit 150 is exemplarily configured to change an angle formed between the center axis 104 and a center axis 131 of each of the workpiece holders 130 (a center axis along the workpiece holder 130 projecting from a corresponding one of the turning arms 122).

The tilting drive unit 150 exemplarily tilts each of the workpiece holders 30 around a tilting axis 153 perpendicular to the center axis 104. Such a perpendicular state herein includes a skew positional relation like multilevel crossing. The tilting drive unit 150 is exemplarily configured to tilt each of the workpiece holders 130 around the tilting axis 153 that passes a basal part (a connection part to the corresponding turning arm 122) of the workpiece holder 130 and is perpendicular to a vertical virtual plane including the center axis 104 and the center axis 131 of the workpiece holder 130. For example, the tilting drive unit 150 tilts each of the workpiece holders 130 around the tilting axis 153 that passes the basal part (the connection part to the corresponding turning arm 122) of the workpiece holder 130 and is perpendicular to the center axis 104 and a center axis 123 of the turning arm 122. The tilting drive unit 150 may alternatively be configured to tilt each of the workpiece holders 130 around the tilting axis 153 that is perpendicular to the center axis 104 and extends along the center axis 123 of the corresponding turning arm 122.

The tilting drive unit 150 may alternatively be configured to independently tilt the plurality of workpiece holders 130. The tilting drive unit 150 may exemplarily include, for each of the workpiece holders 130, an electric motor 151 and a transmitter 152 configured to transmit motive power of the motor 151 to the workpiece holder 130. The motor 151 may be incorporated in the body 121 and the transmitter 152 may be incorporated in the corresponding turning arm 122. The transmitter 152 can be constituted by appropriately combined transmission elements such as a bevel gear, a transmission shaft, or a timing belt. The tilting drive unit 150 exemplarily includes two motors 151 and two transmitters 152, and the two motors 151 are incorporated in the body 121 and the two transmitters 152 are incorporated respectively in the two turning arms 122. The two transmitters 152 transmit motive power of the two motors 151 respectively to the two workpiece holders 130.

The spin drive unit 160 spins each of the workpiece holders 130 about a spin axis 163 perpendicular to the tilting axis 153. Spin of an object indicates rotation passing the object about an axis fixed to the object. The spin axis 163 exemplarily tilts along with each of the workpiece holders 130 in accordance with tilt of the workpiece holder 130 by the tilting drive unit 150. The spin drive unit 160 exemplarily spins each of the workpiece holders 130 about the center axis 131.

The spin drive unit 160 may alternatively be configured to independently spin the plurality of workpiece holders 130. The spin drive unit 160 may exemplarily include, for each of the workpiece holders 130, an electric motor 161 and a transmitter 162 configured to transmit motive power of the motor 161 to the workpiece holder 130. The motor 161 may be incorporated in the body 121 and the transmitter 162 may be incorporated in the corresponding turning arm 122. The transmitter 162 can be constituted by appropriately combined transmission elements such as a bevel gear, a transmission shaft, or a timing belt. The spin drive unit 160 exemplarily includes two motors 161 and two transmitters 162, and the two motors 161 are incorporated in the body 121 and the two transmitters 162 are incorporated respectively in the two turning arms 122. The two transmitters 162 transmit motive power of the two motors 161 respectively to the two workpiece holders 130.

The robot 10 applies work to the workpiece 2 positioned in the working region 101 by the conveying device 100. The robot 10 exemplarily paints the workpiece 2 held by the workpiece holder 130 positioned in the working region 101. The robot 10 is exemplified by a vertical articulated robot having six axes and including a basal part 11, a turning part 12, a first arm 13, a second arm 14, a third arm 17, and a tip 18.

The basal part 11 is positioned above the turning part 120 and is fixed onto the guide 111. The turning part 12 is provided on the basal part 11 so as to turn about a vertical axis 21. The first arm 13 is connected to the turning part 12 so as to swing about an axis 22 crossing (e.g. perpendicular to) the axis 21. Such a crossing state also includes a skew positional relation like so-called multilevel crossing. The second arm 14 is connected to a tip of the first arm 13 so as to swing about an axis 23 substantially parallel to the axis 22. The second arm 14 includes an arm basal part 15 and an arm end 16. The arm basal part 15 is connected to the tip of the first arm 13 and extends along an axis 24 crossing (e.g. perpendicular to) the axis 23. The arm end 16 is connected to a tip of the arm basal part 15 so as to turn about the axis 24. The third arm 17 is connected to a tip of the arm end 16 so as to swing about an axis 25 crossing (e.g. perpendicular to) the axis 24. The tip 18 is connected to a tip of the third arm 17 so as to turn about an axis 26 crossing (e.g. perpendicular to) the axis 25.

The robot 10 includes a joint 31 connecting the basal part 11 and the turning part 12, a joint 32 connecting the turning part 12 and the first atm 13, a joint 33 connecting the first arm 13 and the second arm 14, a joint 34 connecting the arm basal part 15 and the arm end 16 of the second arm 14, a joint 35 connecting the arm end 16 and the third arm 17, and a joint 36 connecting the third arm 17 and the tip 18.

Exemplary actuators 41 to 46 each include an electric motor and a speed reducer, and drive the joints 31 to 36, respectively. The actuator 41 exemplarily turns the turning part 12 about the axis 21, swings the first arm 13 about the axis 22, swings the second arm 14 about the axis 23, turns the arm end 16 about the axis 24, swings the third arm 17 about the axis 25, and turns the tip 18 about the axis 26.

The tip 18 is provided with a painting tool 50. That is, the robot 10 further includes the painting tool 50. The painting tool 50 is configured to discharges an atomized coating material. The painting tool 50 may alternatively be configured to individually discharge a plurality of types of coating materials. The painting tool 50 exemplarily includes a plurality of (e.g. three) discharge nozzles 51 to 53 configured to respectively discharge the plurality of (e.g. three) types of coating materials. The discharge nozzles 51 to 53 are exemplarily connected respectively to supply sources (not depicted) of the three types of coating materials. For example, the discharge nozzle 51 discharges a foundation coating material. The discharge nozzle 52 discharges a main coating material. The discharge nozzle 53 discharges a clear coating material.

The robot 10 can be appropriately modified in terms of its specific configuration. For example, the robot 10 may be configured as a redundant robot having seven axes, obtained by adding an axle joint to the vertical articulated robot having the six axes, or may be configured as a so-called SCARA articulated robot.

The conveyance controller 400 controls the conveying device 100 whereas the robot controller 300 controls the robot 10. The conveyance controller 400 exemplarily causes the revolution drive unit 140 to turn the turning part 120 so as to shift the workpiece holder 130 between the working region 101 and the delivery region 102. The robot controller 300 causes the robot 10 to paint the workpiece 2 positioned in the working region 101 by the conveying device 100. The conveyance controller 400 may cause the tilting drive unit 150 and the spin drive unit 160 to change a posture of the workpiece 2 while the robot 10 paints the workpiece 2 held by the workpiece holder 130. The robot controller 300 and the conveyance controller 400 are provided around the guide 111 or the like.

Internal Structure of Conveying Device

Figure 3:
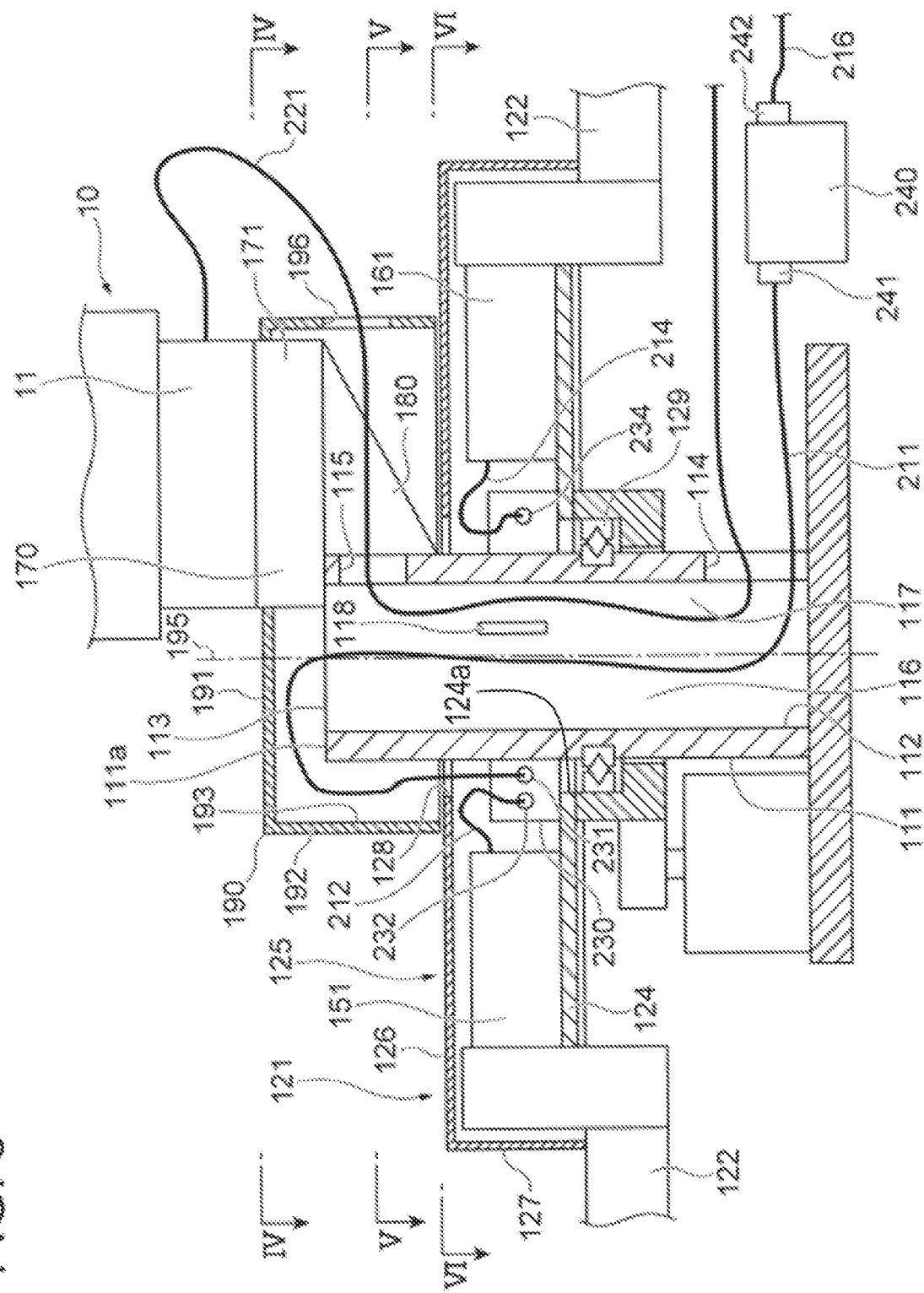
FIG. 3 a sectional view of a turning part and a guide.

The conveying device 100 will be detailed next in terms of its internal structure. As depicted in FIG. 3, the body 121 of the turning part 120 includes a turning base 124 and a cover 125. The turning base 124 is fitted to the guide 111 so as to turn about the center axis 104. The turning base 124 exemplarily has an opening 124a, allowing the guide 111 to pass therethrough. The turning base 124 is fitted, via the bearing 129, to an outer peripheral surface of the guide 111 passing through the opening 124a.

The turning base 124 has an outer periphery connected to the two turning arms 122. The turning base 124 is provided thereon with the two motors 151 (first devices) of the tilting drive unit 150 and the two transmitters 162 (second devices) of the spin drive unit 160. For example, the two motors 151 are connected respectively to the two transmitters 152 and are fixed onto the turning base 124. The two motors 161 are connected respectively to the two transmitters 162 and are fixed onto the turning base 124.

The cover 125 covers the two motors 151 and the two motors 161 fixed onto the turning base 124 and is fixed to the turning base 124. The turning base 124 includes a peripheral wall 127 surrounding the two motors 151 and the two motors 161, and a top board 126 closing a top of the peripheral wall 127. The top board 126 has an opening 128 allowing the guide 111 to pass therethrough. The opening 128 and the guide 111 interpose a gap for wiring.

The guide 111 has a top projecting upward from an upper surface of the body 121 (an upper surface of the top board 126). The guide 111 has a wiring hole 112 extending along the center axis 104. The wiring hole 112 is opened to an upper end surface of the guide 111. The guide 111 accordingly has an upper end provided with an opening 113. The guide 111 has a lower portion positioned below the body 121 and having an opening 114 allowing communication between a space below the body 121 and the wiring hole 112.

Figure 4:
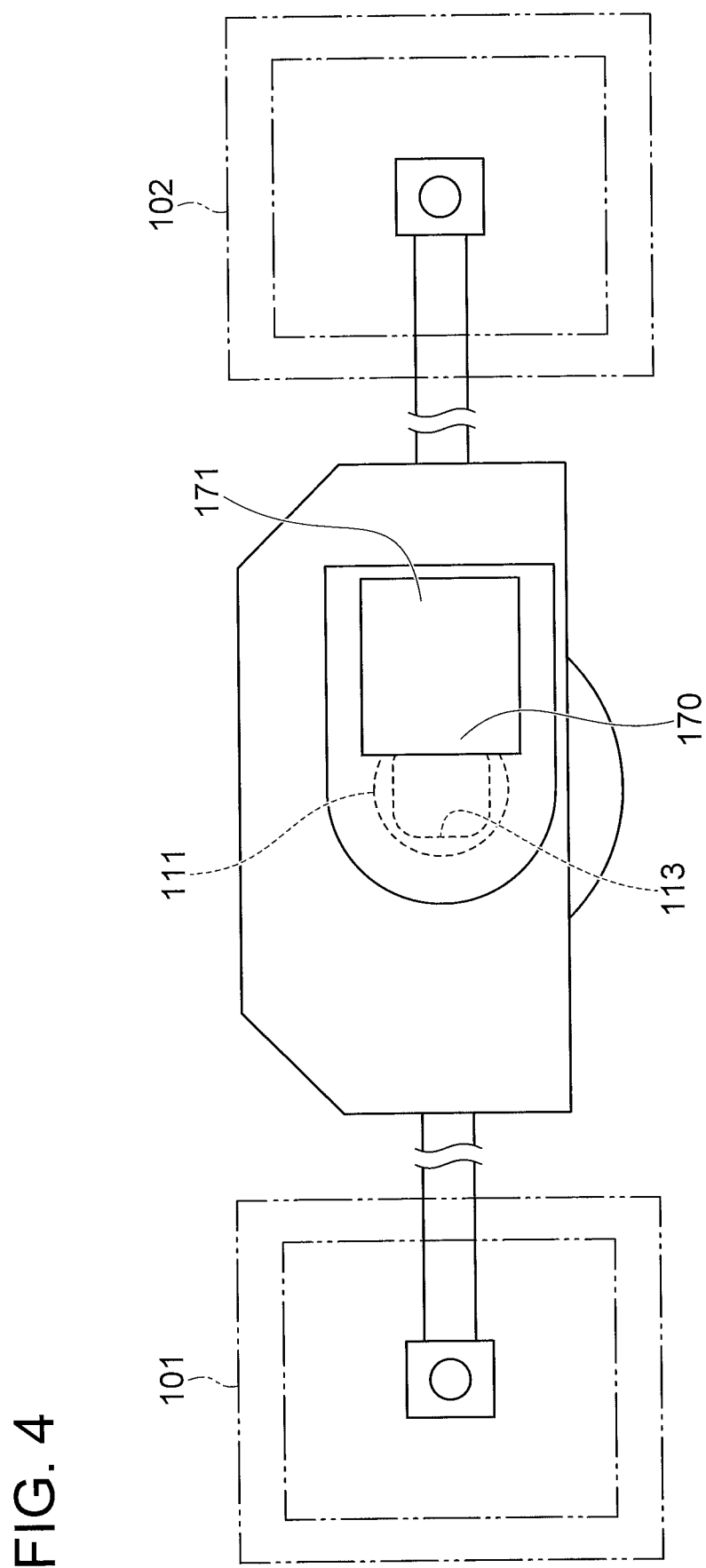
FIG. 4 is a sectional view taken along line IV-IV indicated in FIG. 3.

The conveying device 100 further includes a support 170. The support 170 is provided on the guide 111 and supports the robot 10. For example, the support 170 is fixedly provided thereon with the basal part 11 of the robot 10. The support 170 exposes at least part (passage) of the opening 113 and is fixed to the upper end of the guide 111. Namely, the support 170 is provided on the upper end of the guide 111 to have a passage in the opening 113. The support 170 may have a bulge 171 from the outer periphery of the guide 111. For example, when viewed from above, the support 170 is positioned such that the support 170 and the working region 101 interpose the opening 113 (an exposed portion of the opening 113), and the bulge 171 extends to be away from the working region 101 (see FIG. 4). Such an exposed portion of the opening 113 will hereinafter be called "an exposed part of the opening 113".

Figure 5:
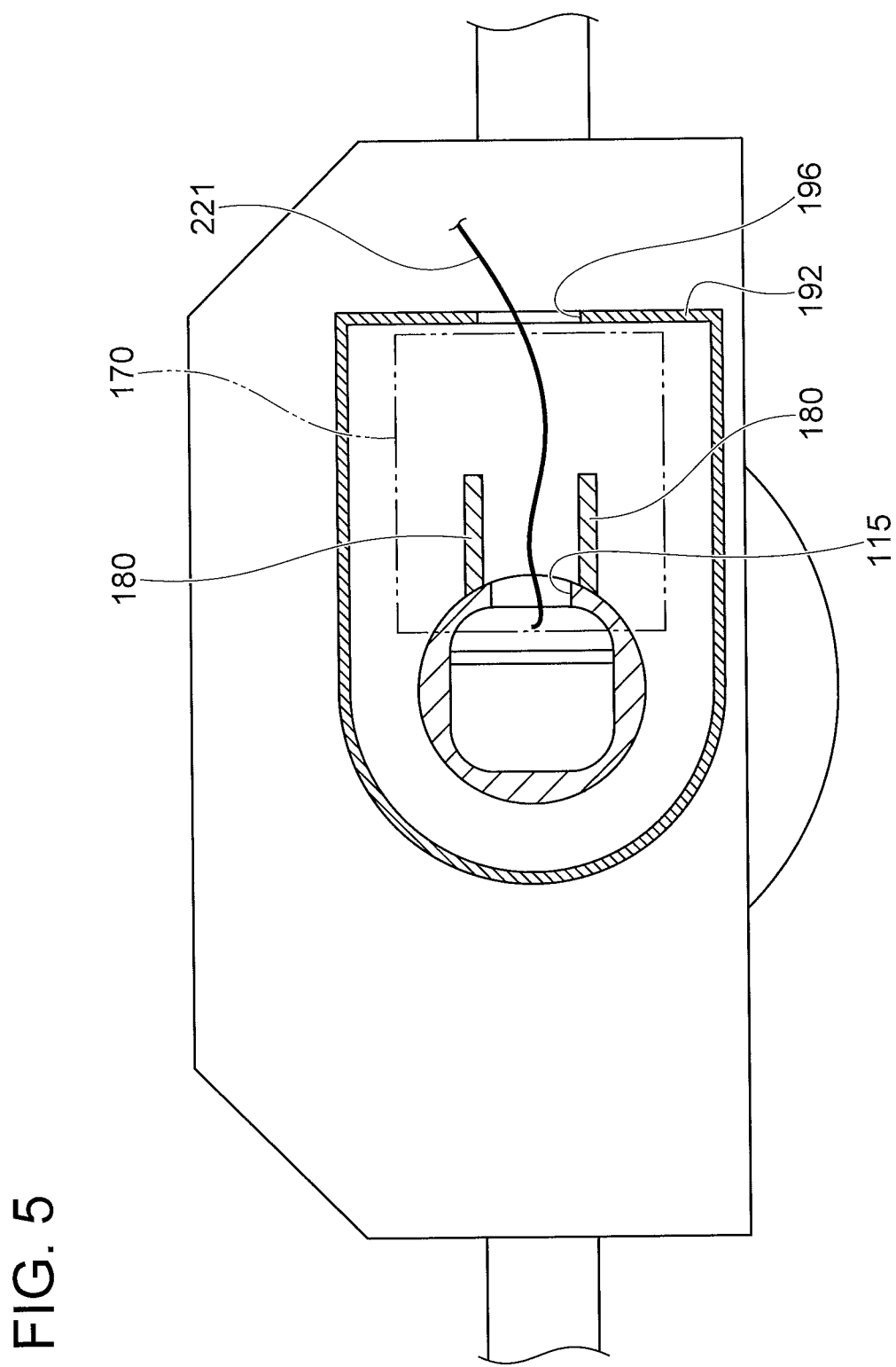
FIG. 5 is a sectional view taken along line V-V indicated in FIG. 3.

The conveying device 100 may further include a reinforcement 180. The reinforcement 180 is constituted by a rib connecting a lower surface of the bulge 171 and the outer peripheral surface of the guide 111 at a position above the turning part 120 (above the upper surface of the top board 126). The conveying device 100 exemplarily includes two reinforcements 180 aligned along the periphery of the guide 111 (see FIG. 5).

The exposed part of the opening 113 (a portion 111a, uncovered with the support 170, of the upper end of the guide 111) is positioned above the turning part 120 (above the upper surface of the top board 126). The exposed part of the opening 113 (the portion 111a) and an upper surface of the turning part 120 (the upper surface of the top board 126) may have larger difference in height than difference in height between a lower surface of the support 170 and the exposed part of the opening 113 (the portion 111a). The portion 111a may exemplarily be positioned at height closer to the support 170 (closer to the lower surface of the support 170) between the turning part 120 and the support 170 (between the upper surface of the top board 126 and the lower surface of the support 170). Such a state where the portion 111a is positioned at the height closer to the support 170 includes a state where the portion 111a is leveled with the lower surface of the support 170. The portion 111a may alternatively be positioned to be higher than the lower surface of the support 170. The portion 111a may be covered with any other member of the support 170 (e.g. a cover 190 or a second support 250 to be described later), although the portion 111a and the member need to interpose a gap at least for provision of a linear object 211.

The portion, uncovered with the support 170, of the opening 113 may include the center axis 104 of the revolution orbit 103. The portion, including the center axis 104, of the opening 113 may be exposed without being covered with the support 170.

The conveying device 100 may have the linear object 211 passing the guide 111 (through the wiring hole 112) and connecting the two motors 151 and the two motors 161 (the first devices) and the conveyance controller 400 (the second device). The linear object 211 includes a power supply cable from the conveyance controller 400 to the two motors 151 and the two motors 161. The linear object 211 passes through the opening 113 at the upper end of the guide 111 and is connected to the two motors 151 and the two motors 161, as well as passes through the opening 114 provided in the lower portion of the guide 111 and is connected to the conveyance controller 400.

The conveying device 100 may further include a relay box 230, two linear objects 212 respectively connecting the relay box 230 and the two motors 151, and two linear objects 214 respectively connecting the relay box 230 and the two motors 161. The linear objects 212 and 214 (second linear objects) include a power supply cable from the relay box 230 to each of the motors 151.

The linear objects 212 each have a first end connected to the corresponding motor 151 while exerting predetermined explosion proof performance. The linear objects 214 each have a first end also connected to the corresponding motor 161 while exerting the explosion proof performance. The first end of each of the linear objects 212 is directly connected to the corresponding motor 151 via no connector, and the first end of each of the linear objects 214 is also directly connected to the corresponding motor 161 via no connector.

The relay box 230 is fixed to the turning part 120, and the linear object 211 is connected to the linear objects 212 and 214 via the relay box 230. For example, the relay box 230 is incorporated in the turning part 120 and is fixed onto the turning base 124. The relay box 230 includes a relay connector 231, two relay connectors 232, and two relay connectors 234. The relay connector 231 and the relay connectors 232 and 234 are connected in the relay box 230 while exerting predetermined explosion proof performance.

The linear objects 212 each have a second end detachably connected to a corresponding one of the relay connectors 232 by a connector exerting the explosion proof performance. The linear objects 214 each have a second end detachably connected to a corresponding one of the relay connectors 234 by a connector exerting the explosion proof performance. The linear object 211 has a first end detachably connected to the relay connector 231 by a connector exerting the explosion proof performance. Accordingly, the linear object 211 is connected to the linear objects 212 via the relay connectors 231 and 232, and is connected to the linear objects 214 via the relay connectors 231 and 234.

The conveying device 100 may further include a relay box 240 connected to the conveyance controller 400 via a linear object 216 (third linear object). The linear object 216 includes a power supply cable from the conveyance controller 400 to the relay box 240. The relay box 240 is provided around the guide 111. The linear object 211 is connected to the linear object 216 via the relay box 240. The relay box 240 exemplarily includes relay connectors 241 and 242 (second relay connectors). The relay connector 241 and the relay connector 242 are connected in the relay box 240 while exerting the explosion proof performance.

The linear object 216 has a first end detachably connected to the relay connector 242 by a connector exerting the explosion proof performance. The linear object 211 has a second end detachably connected to the relay connector 241 by a connector exerting the explosion proof performance. The linear object 211 is accordingly connected to the linear object 216 via the relay connectors 241 and 242.

The relay boxes 230 and 240 divide the linear objects connecting the conveyance controller 400 and the motors 151 and 161 into the linear objects 212 and 214, the linear object 211, and the linear object 216 also in terms of explosion proof environments. The linear object 211 passes the guide 111 and connects the relay box 230 in the turning part 120 and the relay box 240 provided outside the turning part 120, and thus receives like torsion due to turn of the turning part 120. In contrast, the linear objects 212 and 214 entirely turn along with the turning part 120 and are thus unlikely to receive stress due to turn of the turning part 120. The linear object 216 is entirely provided outside the turning part 120 and is thus unlikely to receive stress due to turn of the turning part 120. The structure allowing division into the linear objects 212 and 214, the linear object 211, and the linear object 216 keeps excellent connection states between the conveyance controller 400 and the motors 151 and 161 with simple maintenance work of replacing only the linear object 211 depending on a deterioration state.

This maintenance work involves a method of providing the linear object 211 including causing the linear object 211 to penetrate the guide 111, connecting the first end of the linear object 211 passing the guide 111 and reaching above the turning part 120 to the relay box 230 (i.e. connecting to the motors 151 and 161), and connecting the second end of the linear object 211 passing the guide 111 and reaching below the turning part 120 to the conveyance controller 400 provided around the guide 111.

The conveying device 100 may further include a linear object 221 (robot linear object) passing the guide 111 and connecting the robot 10 and the robot controller 300. The linear object 221 includes a power supply cable from the robot controller 300 to the robot 10. The linear object 211 moves along with turn of the turning part 120 whereas the linear object 221 does not move even when the turning part 120 turns.

The conveying device 100 may further include a separator 118 partitioning the interior of the guide 111 (the interior of the wiring hole 112) into a first area 116 that the linear object 211 passes and a second area 117 that the linear object 221 passes. This configuration inhibits deterioration of the linear object 221 due to the linear object 211 moving along with turn of the turning part 120.

The separator 118 may exemplarily be provided to partition the interior of the wiring hole 112 into the first area 116 positioned adjacent to the working region 101 and the second area 117 positioned adjacent to the delivery region 102. The separator 118 in the wiring hole 112 may be provided such that the first area 116 includes the center axis 104. The linear object 211 can thus be provided adjacent to the center axis 104 so as to be inhibited from moving along with turn of the turning part 120.

The guide 111 may have an opening 115 (a second opening) allowing communication between the second area 117 and a space between the bulge 171 and the turning part 120 (between the lower surface of the bulge 171 and the upper surface of the top board 126), and the linear object 221 may pass through the opening 115 and be connected to the robot 10. The opening 115 is exemplarily provided between the two reinforcements 180 (see FIG. 5). This configuration more reliably inhibits deterioration of the linear object 221 due to movement of the linear object 211. The linear object 221 passes through the opening 114 provided in the lower portion of the guide 111 and is connected to the robot controller 300.

The conveying device 100 may further include the cover 190 provided on the turning part 120 and covering the top of the guide 111. The cover 190 includes a peripheral wall 192 and a top board 191, and is fixed to the guide 111. The peripheral wall 192 surrounds the guide 111 such that the peripheral wall 192 and the outer peripheral surface of the guide 111 interpose a wiring space 193 (see FIG. 5). The peripheral wall 192 has an opening 196 allowing the linear object 221 extending outward from the guide 111 through the opening 115 to pass therethrough. The opening 196 is provided between the guide 111 and the delivery region 102. The top board 191 closes the top of the peripheral wall 192. The top board 191 has an opening 195 exposing the support 170 upward.

Figure 6:
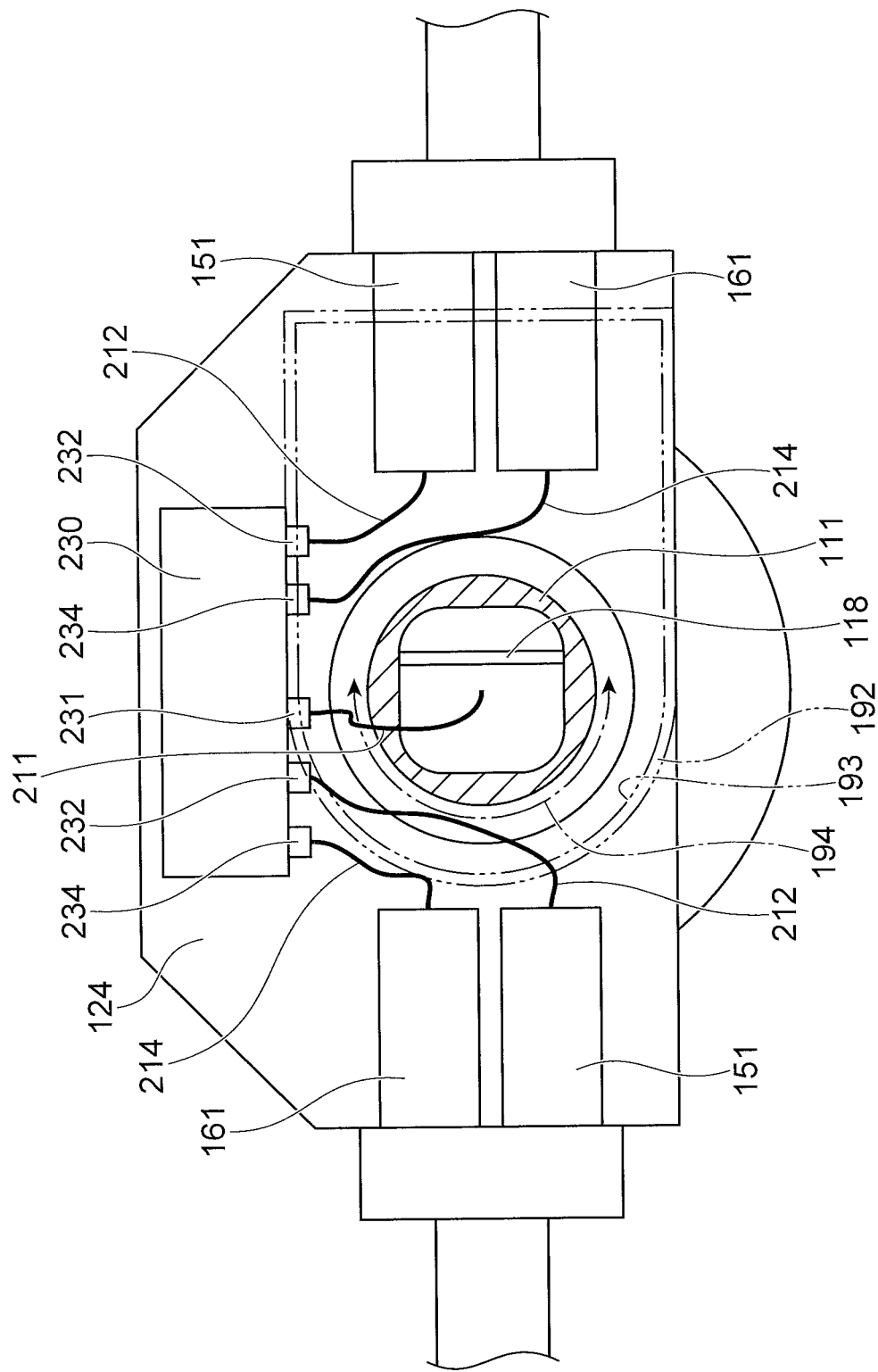
FIG. 6 is a sectional view taken along line VI-VI indicated in FIG. 3.

The linear object 211 passes the interior of the guide 111 and wiring space 193 and is connected to the relay connector 231 in the relay box 230. As depicted in FIG. 6, the cover 190 may surround the guide 111 so as to provide the wiring space 193 entirely in a shift range 194 of the linear object 211 moving at least along with turn of the turning part 120. FIG. 6 depicts a state where the covers 125 and 190 are removed, and the cover 190 is indicated with an imaginary line (two-dot chain line).

Modification Examples

Figure 7:
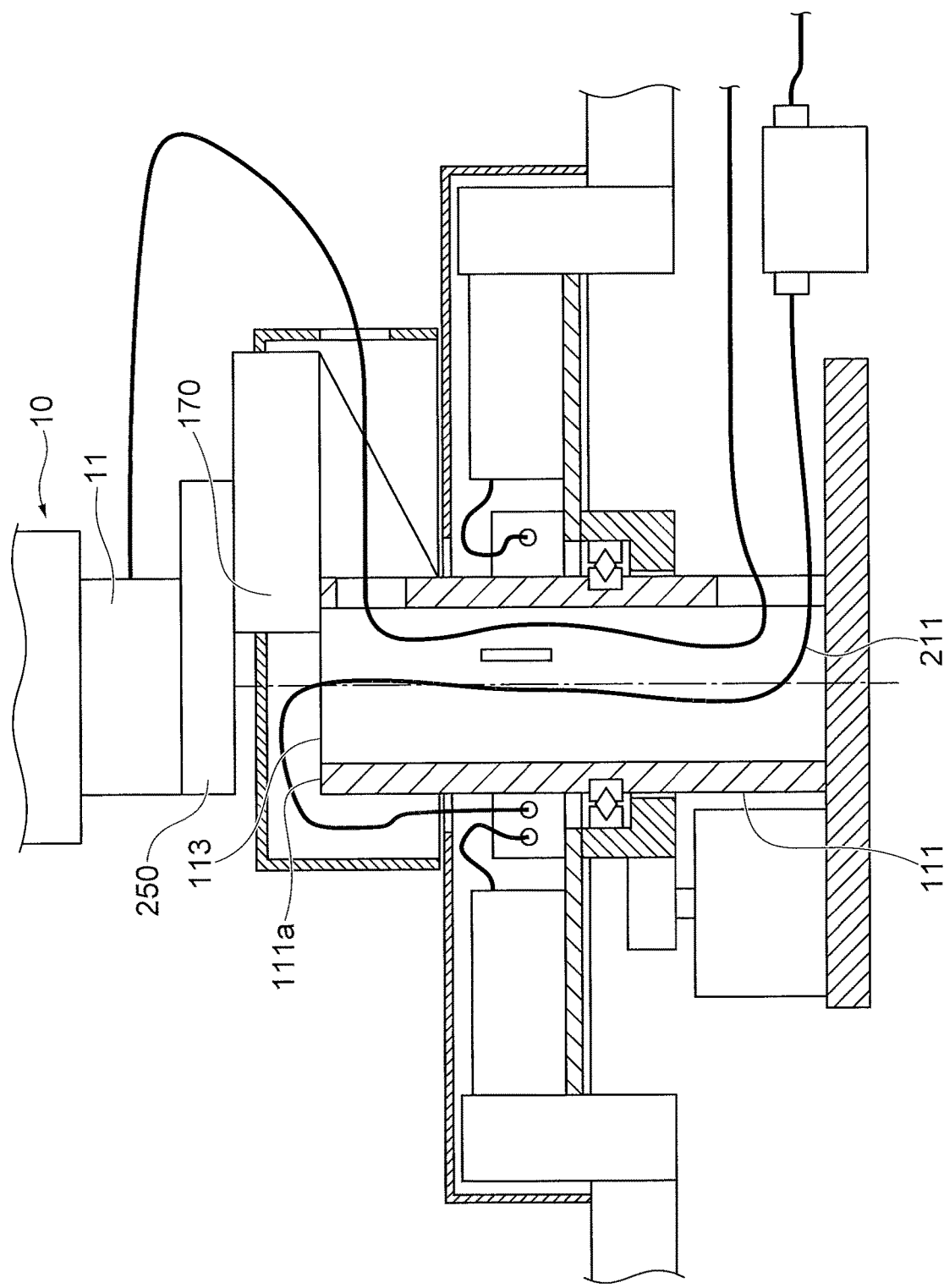
FIG. 7 is a sectional view of a conveying device according to a modification example.

As depicted in FIG. 7, the conveying device 100 may further include the second support 250 bulging from an outer periphery of the support 170 to above the opening 113, and the robot 10 may be provided above the second support 250. The second support 250 may exemplarily be fixedly provided thereon with the basal part 11 of the robot 10. FIG. 7 depicts the second support 250 provided on the support 170 to secure the wiring space for the linear object 211 provided above the portion 111a, uncovered with the support 170, of the upper end of the guide 111.

Figure 8:
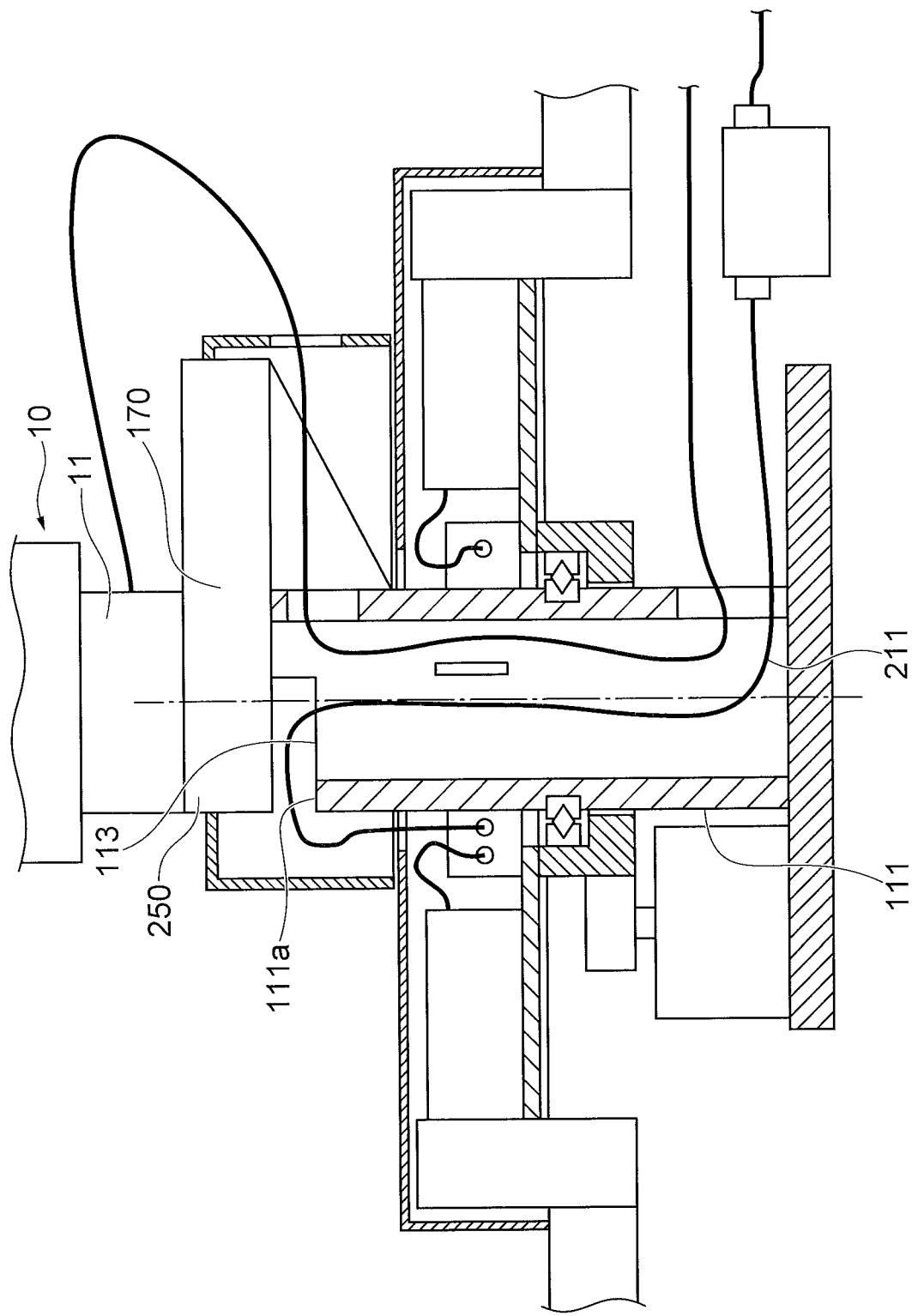
FIG. 8 is a sectional view of a conveying device according to another modification example.

In a case where the portion 111a is positioned below the lower surface of the support 170, the second support 250 may be leveled with the support 170 as depicted in FIG. 8. The second support 250 and the support 170 may alternatively be integrally constituted by a single member (e.g. a single plate material).

Effects of the Present Embodiment

As described above, the robot system 1 includes the conveying device 100 configured to convey the workpiece 2 to the working region 101, and the robot 10 configured to apply work to the workpiece 2 positioned in the working region 101. The conveying device 100 includes the turning part 120 configured to turn about the center axis 104 crossing the horizontal plane, the workpiece holder 130 provided at the turning part 120 to be shifted along the revolution orbit 103 passing the working region 101 by turn of the turning part 120 and configured to hold the workpiece 2, the guide 111 being hollow (the guide 111 has a hollow therein) and penetrating the turning part 120 along the center axis 104, the first device (e.g. the motor 151 or 161) provided at the turning part 120, and the linear object 211 passing the guide 111 and connecting the first device and the second device (e.g. the conveyance controller 400) provided around the guide 111.

In the robot system 1 thus configured, the linear object passing the guide 111 extends from a position adjacent to the center axis 104 as a rotation center of the turning part 120 to the first device. The center axis 104 and the first device has distance therebetween unchanged by turn of the turning part 120. The linear object 211 passing the guide 111 can thus extend with less slack. This configuration reduces necessity for consideration of interference between a slack portion of the linear object 211 and any peripheral object. The linear object 211 can thus extend to reach the first device.

The conveying device 100 may further include the support 170 provided on the guide 111 and supporting the robot 10. The guide 111 may have the upper end provided with the opening 113, and the support 170 may be fixed to the upper end of the guide 111 so as to expose at least part of the opening 113. The linear object 211 may pass through the opening 113 and be connected to the first device. The guide 111 can be utilized for support of the robot 10 as well as for provision of the linear object 211, to achieve a simplified device configuration.

The support 170 may have the bulge 171 from the outer periphery of the guide 111, and the conveying device 100 may further include the reinforcement 180 connecting the lower surface of the bulge 171 and the outer peripheral surface of the guide 111 at a position above the turning part 120. The reinforcement 180 then supplements fixing strength of the support 170 having a reduced margin fixed to the upper end of the guide 111 due to exposure of the opening 113.

The portion 111a, uncovered with the support 170, of the upper end of the guide 111 may be positioned above the turning part 120. The guide 111 is then improved in strength in comparison to a case where the portion 111a is positioned below the upper surface of the turning part 120.

The portion 111a, uncovered with the support 170, of the upper end of the guide 111 and the upper surface of the turning part 120 may have larger difference in height than difference in height between the lower surface of the support 170 and the portion 111a. This configuration achieves further improvement in strength of the guide 111.

There may be further included the linear object 221 passing the guide 111 and connecting the robot 10 and the robot controller 300 provided around the guide 111. The guide 111 can then be effectively utilized also for provision of the linear object 221 for the robot 10.

The conveying device 100 may further include the separator 118 partitioning the interior of the guide 111 into the first area 116 that the linear object 211 passes and the second area 117 that the linear object 221 passes. This configuration inhibits deterioration of the linear object 221 due to movement of the linear object 211 along with turn of the turning part 120.

The guide 111 may have the opening 115 allowing communication between the second area 117 and the space between the bulge 171 and the turning part 120, and the linear object 221 may pass through the opening 115 and be connected to the robot 10. This configuration more reliably inhibits deterioration of the linear object 221.

The support 170 may be positioned such that the support 170 and the working region 101 interpose the opening 113, and the bulge 171 may bulge to be away from the working region 101. This configuration facilitates securement of distance between the working region 101 and the robot 10. In the case where the conveying device 100 includes the tilting drive unit 150 and the spin drive unit 160 as in the above embodiment, the workpiece 2 may have a target portion of work executed by the robot 10, the portion being directed toward the robot 10, and the robot 10 can thus be easily positioned away from the working region 101. The support 170 can thus be easily positioned away from the working region 101 so as to expose the opening 113.

The portion, uncovered with the support 170, of the opening 113 may include the center axis 104. The linear object 211 can then be positioned closer to the rotation center of the turning part 120. This configuration further facilitates provision of the linear object 211.

The conveying device 100 may further include the second support 250 bulging from the outer periphery of the support 170 to above the opening 113, and the robot 10 may be provided above the second support 250. This configuration secures a route of the linear object 211 through the opening 113 as well as achieves flexible positional adjustment of the robot 10.

The conveying device 100 may further include the relay connector 231 fixed to the turning part 120, and the linear object 212 or 214 connecting the first device and the relay connector 231, and the linear object 211 may be connected to the linear object 212 or 214 via the relay connector 231. The route of the linear object 211 can be easily adjusted by provision of the relay connector 231. Furthermore, the linear object 211 receiving stress due to turn of the turning part 120 is separated from the linear object 212 or 214 to keep the excellent connection state between the first device and the second device with the simple maintenance work of replacing only the linear object 211 depending on the deterioration state.

The conveying device 100 may further include the relay connector 241 provided around the guide 111 and connected to the second device by the linear object 216, and the linear object 211 may be connected to the linear object 216 via the relay connector 241. This configuration achieves more facilitated replacement of the linear object 211.

The conveying device 100 may further include the cover 190 provided on the turning part 120 and surrounding the guide 111 so as to provide the wiring space 193 between the cover 190 and the outer peripheral surface of the guide 111, and the linear object 211 may pass the interior of the guide 111 and the wiring space 193 and be connected to the first device. This configuration more reliably avoids interference between the linear object 211 and any peripheral object.

The cover 190 may be fixed to the guide 111, and the wiring space 193 may be provided to surround the guide 111 entirely in the shift range 194 of the linear object 211 moving at least along with turn of the turning part 120. This configuration achieves protection of the linear object 211 by the cover 190 as well as movability of the linear object 211.

The embodiment has been described above. The present invention should not necessarily be limited to the above embodiment and can be modified in various manners within a range not departing from the gist of the present invention. The work executed by the robot 10 should not necessarily be limited to painting. The robot system 1 is applicable also to any work that needs positioning of the workpiece 2 as a working target around the robot 10. The first device should not necessarily be limited to the motor. Examples of the first device include a sensor, electrically powered equipment such as an electric pneumatic regulator, and pneumatic drive equipment such as an air operation valve. The linear object in this configuration includes a pressure transmission air tube.

What is claimed is:
1. A robot system comprising:
   a robot configured to perform work on a workpiece positioned in a working region; and
   a conveying device configured to convey the workpiece to the working region and comprising:
      a turning part configured to rotate about a center axis;
      a guide having a hollow in the guide extending along the center axis, the turning part is rotatably supported on an outer peripheral surface of the guide such that the turning part is rotatable about the center axis;
      a workpiece holder configured to hold the workpiece and provided at the turning part to move together with the turning part along a circular orbit around the center axis passing the working region;
      a first device provided at the turning part; and
      a linear object passing through the hollow in the guide and connecting the first device and a second device provided around the guide, wherein
   the conveying device includes a cover which is provided on the turning part, the cover having an opening through which the guide extends,
   a gap is provided between the opening of the cover and the outer peripheral surface of the guide, and
   the linear object passing through the gap and being connected to the first device.
2. The robot system according to claim 1, wherein
   the guide has an upper end provided with an opening,
   the conveying device includes a support which supports the robot and which is provided on the upper end of the guide to have a passage in the opening, and
   the linear object passes through the passage and is connected to the first device.
3. The robot system according to claim 2, wherein
   the support has a bulge protruding from an outer periphery of the guide, and
   the conveying device further includes a reinforcement connecting a lower surface of the bulge and the outer peripheral surface of the guide at a position above the turning part.
4. The robot system according to claim 3, wherein
   the passage is positioned above the turning part.
5. The robot system according to claim 4, wherein
   a difference in height between the passage and an upper surface of the turning part is larger than a difference in height between a lower surface of the support and the passage.
6. The robot system according to claim 3, wherein
   the support is positioned such that the opening is provided between the support and the working region, and
   the bulge protrudes away from the working region.
7. The robot system according to claim 2, further comprising:
   a robot linear object passing through the guide and connecting the robot and a robot controller provided around the guide.
8. The robot system according to claim 7, wherein
   the conveying device includes a separator partitioning an interior of the guide into a first area through which the linear object passes and a second area through which the robot linear object passes.
9. The robot system according to claim 8, wherein
   the guide has a second opening via which a space around the guide is in communication with the second area, and
   the robot linear object passes through the second opening and is connected to the robot.
10. The robot system according to claim 7, wherein
   the conveying device further includes a second relay connector provided around the guide and connected to the second device via a third linear object, and the linear object is connected to the third linear object via the second relay connector.

11. The robot system according to claim 2, wherein
the opening has a portion which is uncovered by the support and which includes the center axis.

12. The robot system according to claim 2, wherein
the conveying device includes a second support protruding from an outer periphery of the support toward above the opening, and
the robot is provided on the second support.

13. The robot system according to claim 1, wherein the conveying device further comprises
a relay connector provided on the turning part, and
a second linear object connecting the first device and the relay connector, wherein the linear object is connected to the second linear object via the relay connector.

14. The robot system according to claim 1, wherein the cover surrounds the guide to provide the gap entirely in a shift range of the linear object moving at least along with a turn of the turning part.

15. The robot system according to claim 1, wherein
the first device comprises a motor configured to change a posture of the workpiece holder relatively to the turning part,
the second device comprises a controller configured to control the motor, and
the linear object includes a power supply cable from the controller to the motor.

16. A conveying device comprising:
a turning part configured to rotate about a center axis;
a guide having a hollow in the guide extending along the center axis, the turning part is rotatably supported on an outer peripheral surface of the guide such that the turning part is rotatable about the center axis;
a workpiece holder configured to hold a workpiece and provided at the turning part to move together with the turning part along a circular orbit around the center axis passing through a working region;
a first device provided at the turning part;
a linear object passing through the hollow in the guide and connecting the first device and a second device provided around the guide; and
a cover which is provided on the turning part, the cover having an opening through which the guide extends, wherein a gap is provided between the opening of the cover and the outer peripheral surface of the guide, and
the linear object passing through the gap and being connected to the first device.

17. The conveying device according to claim 16, further comprising a bearing provided on the outer peripheral surface of the guide to rotatably support the turning part about the center axis.

18. A robot system comprising:
a robot configured to perform work on a workpiece positioned in a working region; and
a conveying device configured to convey the workpiece to the working region and comprising:
a turning part configured to rotate about a center axis;
a guide supporting the turning part rotatably about the center axis and having a hollow in the guide extending along the center axis;
a workpiece holder configured to hold the workpiece and provided at the turning part to move together with the turning part along a circular orbit around the center axis passing the working region;
a first device provided at the turning part; and
a linear object passing through the hollow in the guide and connecting the first device and a second device provided around the guide, wherein
a basal part of the robot is fixed to the guide such that the basal part is in a fixed relationship with the guide,
the guide is configured to be fixed to a floor surface such that the basal part of the robot and the guide are in a fixed relationship with the floor surface,
the conveying device includes a cover which is provided on the turning part, the cover having an opening through which the guide extends,
a gap is provided between the opening of the cover and the outer peripheral surface of the guide, and
the linear object passing through the gap and being connected to the first device.

19. The robot system according to claim 18, wherein the turning part is rotatably supported on an outer peripheral surface of the guide such that the turning part is rotatable about the center axis.

\* \* \* \* \*